United States Patent [19]

Nalbach

[11] Patent Number: 4,825,995
[45] Date of Patent: May 2, 1989

[54] ARTICLE ORIENTING APPARATUS

[75] Inventor: John C. Nalbach, Western Springs, Ill.

[73] Assignee: John R. Nalbach Engineering Co., Inc., Chicago, Ill.

[21] Appl. No.: 182,896

[22] Filed: Apr. 18, 1988

[51] Int. Cl.$^4$ .............................................. B65G 47/24
[52] U.S. Cl. .................................... 198/380; 198/392; 198/396; 198/400; 198/689.1
[58] Field of Search .............. 198/392, 396, 400, 443, 198/380, 689.1

[56] References Cited

U.S. PATENT DOCUMENTS

| | | | |
|---|---|---|---|
| 3,285,387 | 11/1966 | Ochs | 198/392 X |
| 3,446,335 | 5/1969 | Dubuit | 198/392 X |
| 3,543,909 | 12/1970 | Ueda | 198/392 |
| 3,650,368 | 3/1972 | Nalbach | 198/400 X |
| 3,662,872 | 5/1972 | Nalbach | 198/400 X |
| 3,826,405 | 7/1974 | Hoppman et al. | 198/392 X |
| 3,948,386 | 4/1976 | Nalbach | 198/400 X |
| 4,578,001 | 3/1986 | Ochs et al. | 198/392 X |
| 4,681,209 | 7/1987 | Marti | 198/392 |
| 4,705,156 | 11/1987 | Boling | 198/392 |

FOREIGN PATENT DOCUMENTS

| | | | |
|---|---|---|---|
| 0236174 | 9/1987 | European Pat. Off. | 198/400 |
| 391577 | 9/1965 | Switzerland | 198/400 |
| 1558379 | 12/1979 | United Kingdom | 198/392 |

Primary Examiner—Robert J. Spar
Assistant Examiner—D. Glenn Dayoan
Attorney, Agent, or Firm—Anthony S. Zummer

[57] ABSTRACT

This invention relates to an improved apparatus for orienting and aligning light weight articles, such as, empty light weight plastic bottles. The apparatus includes a hopper for receiving and holding randomly positioned light weight plastic bottles. The hopper is substantially symmetrical about a vertical center axis and includes a conical wall having a center axis coincidental with the center axis of the hopper. The conical wall has its smaller end at the bottom. An upwardly inclined track is fixed to the inside surface of the conical wall. A plurality of pusher bars is mounted within the conical wall and adapted for engagement with light weight plastic bottles on the inclined track for moving the plastic bottles upward along the track. A chute is positionable adjacent to the track for receiving a light weight plastic bottle from the track for orienting the light weight plastic bottle to a position wherein the plastic bottle is in a substantially vertical attitude. The plastic bottle leaves the chute and is delivered to a longitudinal conveyor which carries the plastic bottle away from the chute in a substantially straight line with other plastic bottles.

13 Claims, 5 Drawing Sheets

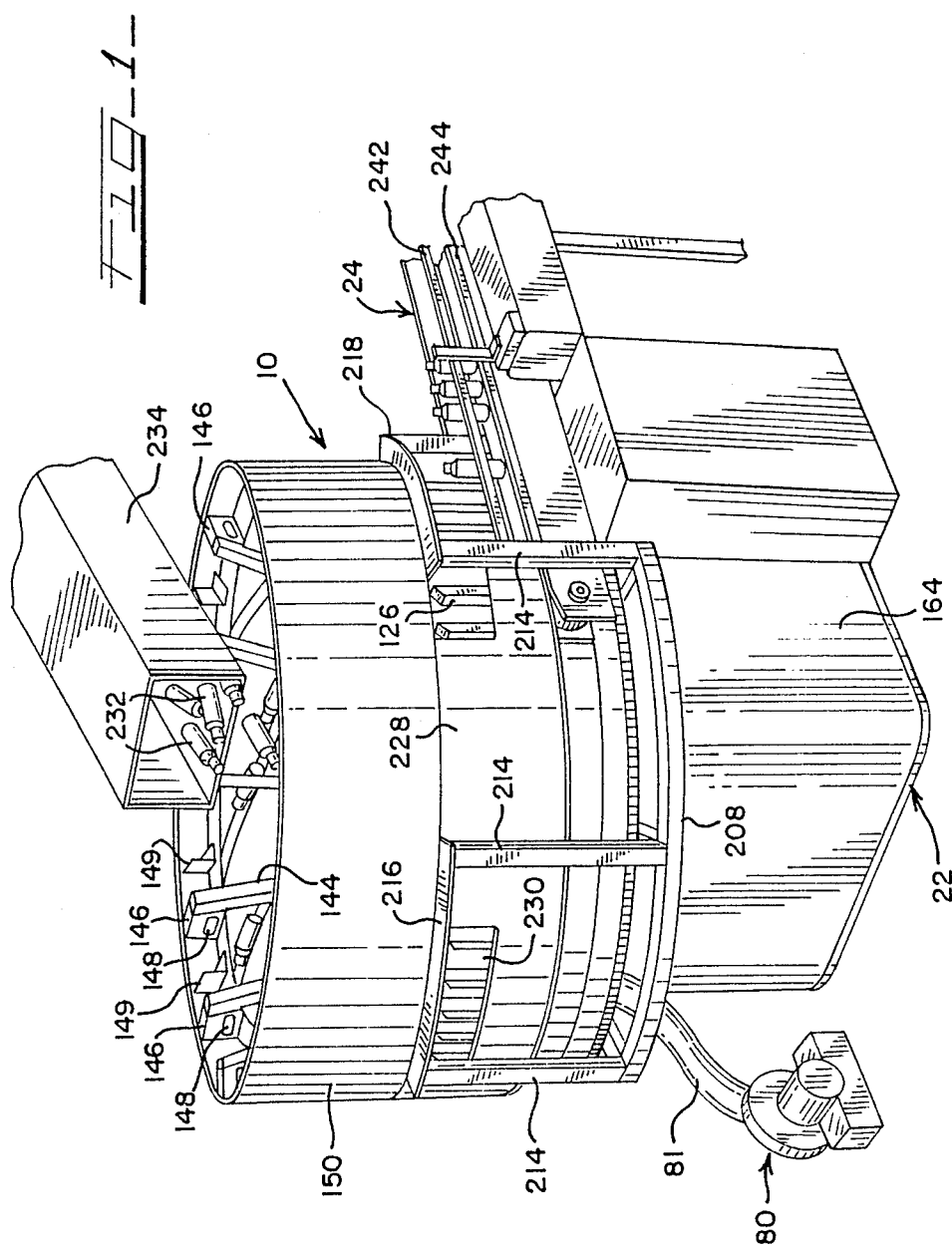

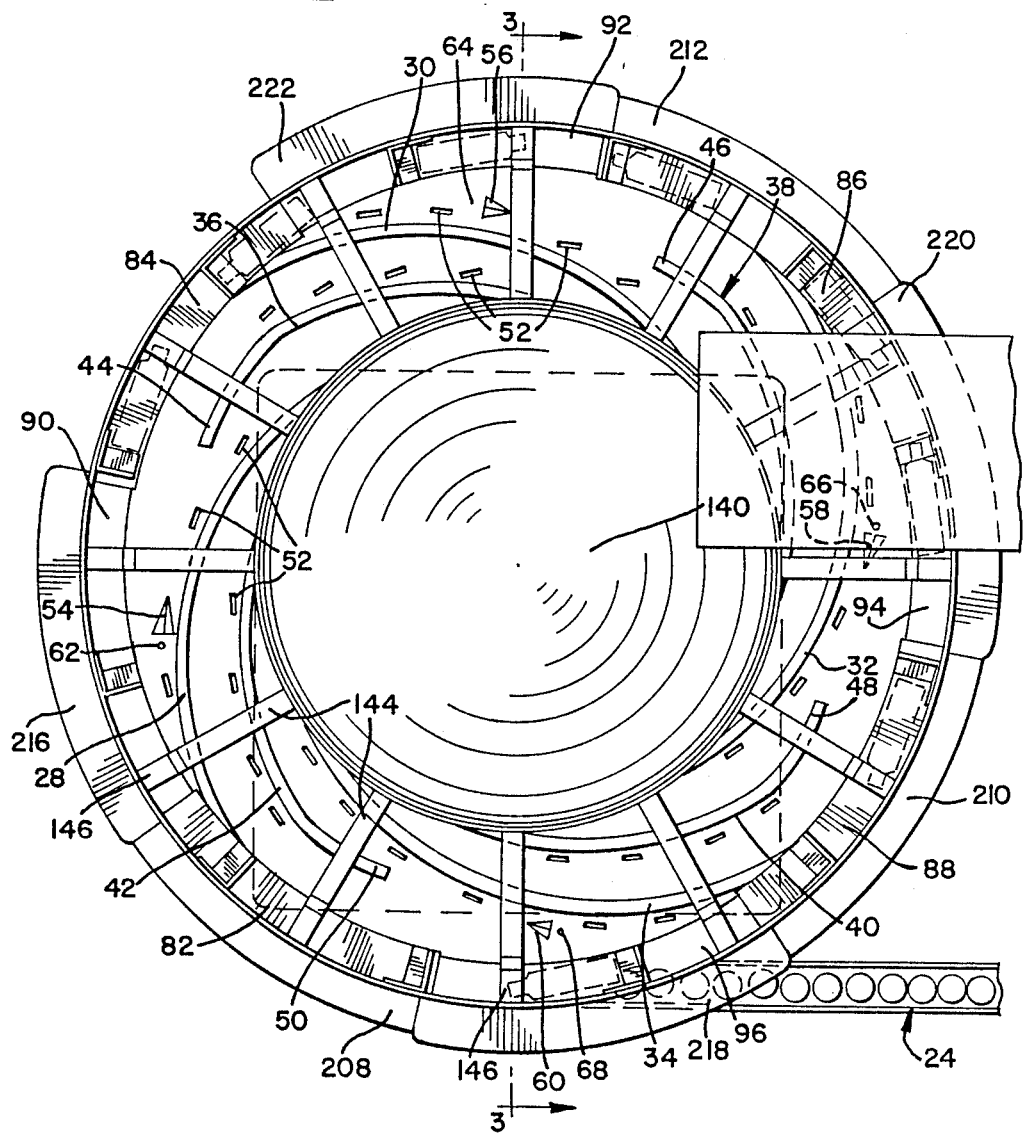

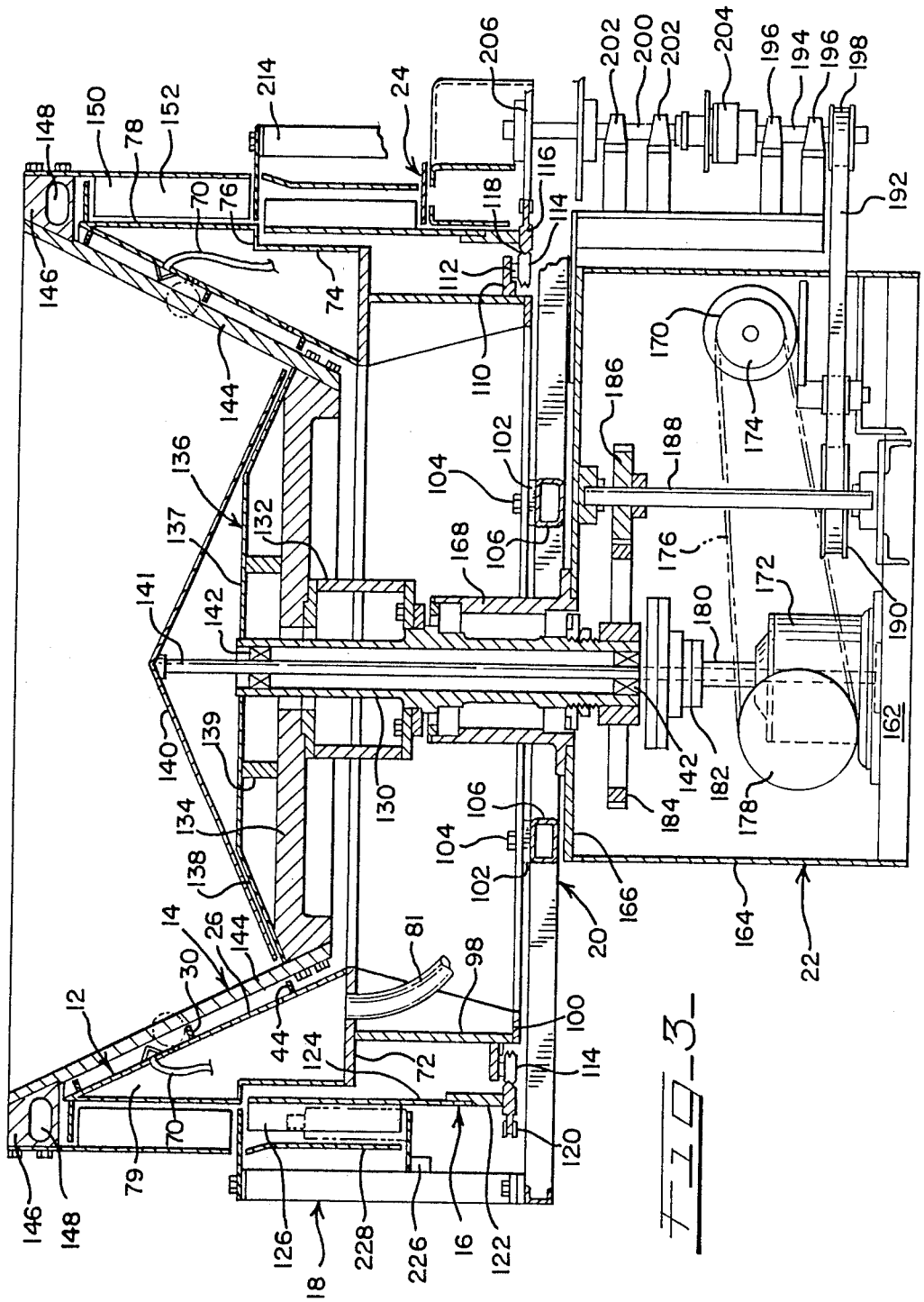

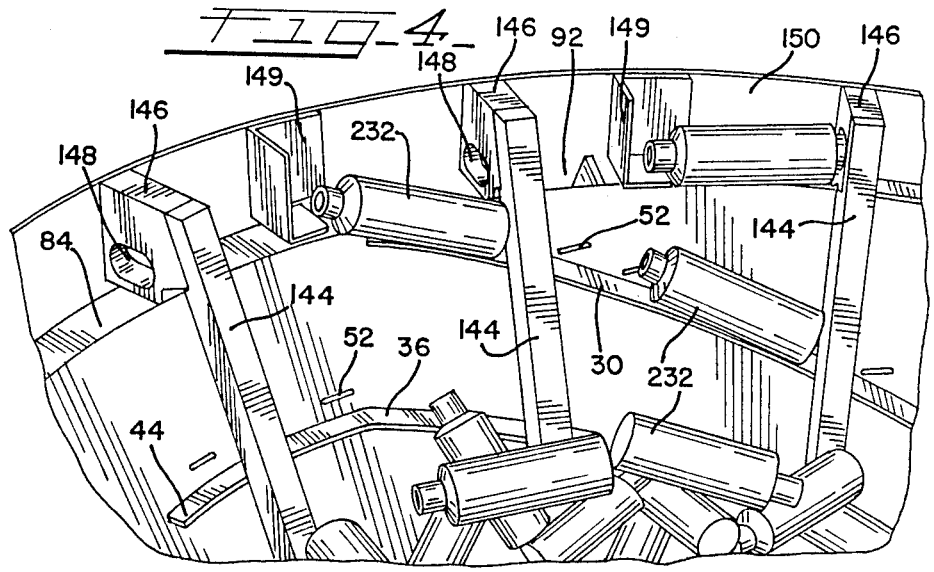
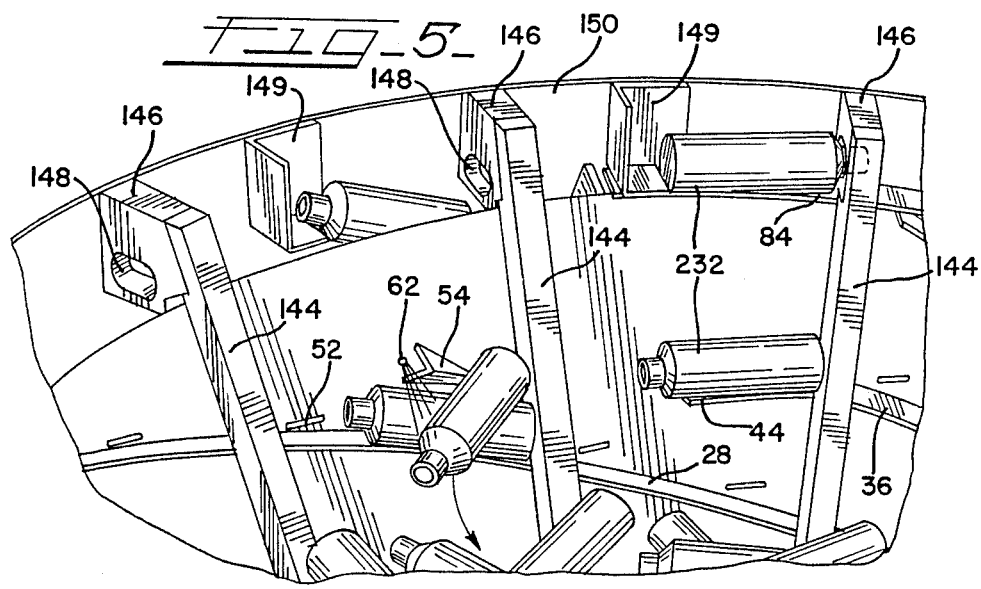

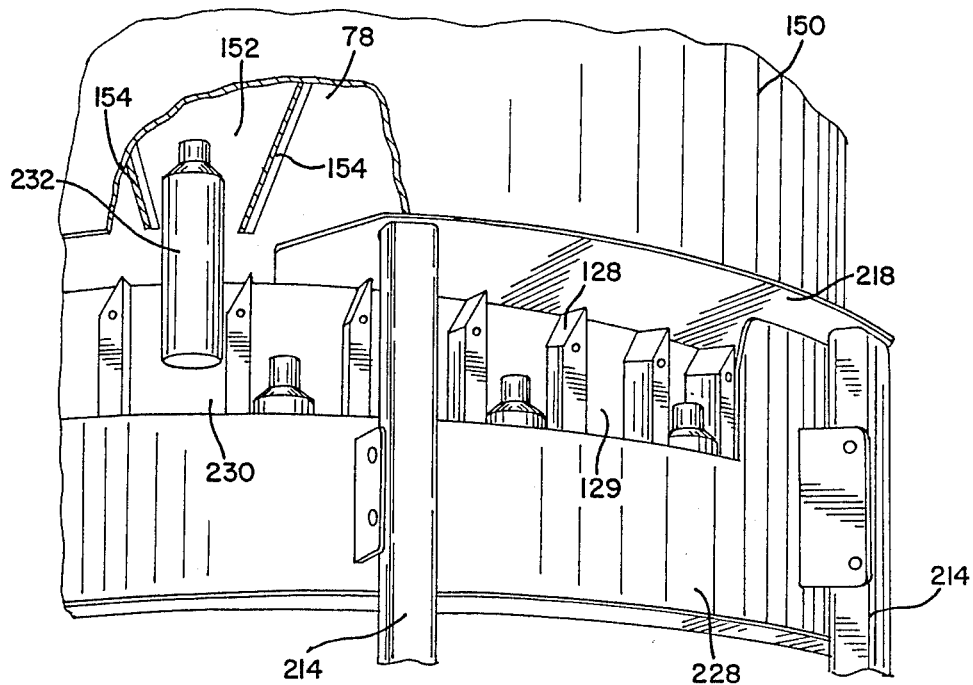
FIG_6_
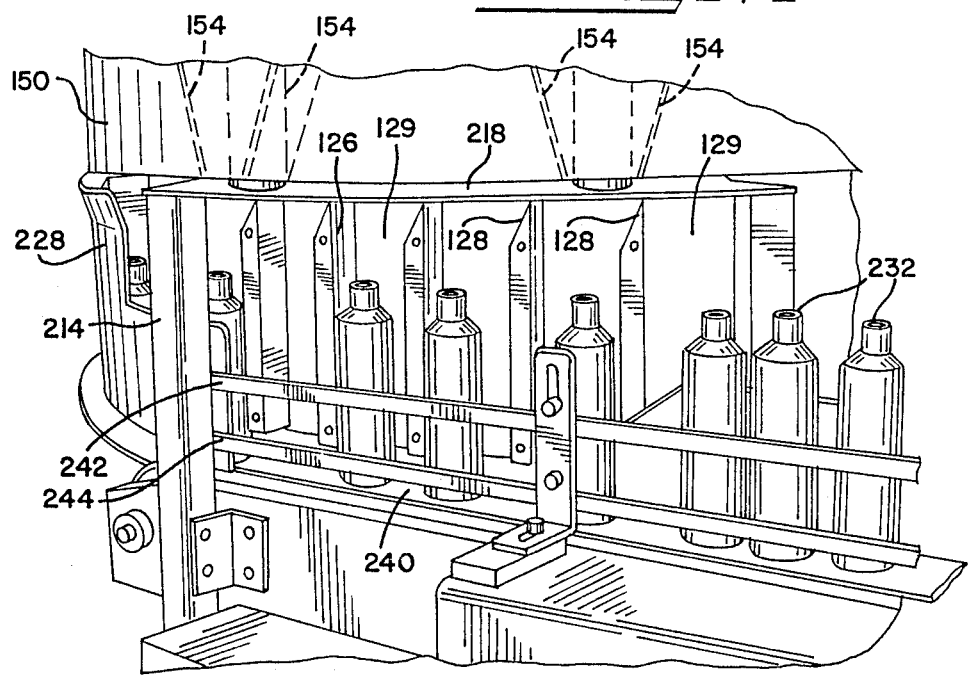
FIG_7_

ARTICLE ORIENTING APPARATUS

BACKGROUND OF THE INVENTION

The use of light weight plastic bottles for packaging a variety of materials is widely accepted in many commercial areas. These plastic bottles are typically filled in automatic filling machines. For optimum operation of the filling machine, the plastic bottles must be in a vertical attitude and aligned in substantially a straight line for receipt of material from the filling machine. When the plastic bottles are manufactured by a typical well known process, such as, blow molding, the plastic bottles are customarily delivered in a random arrangement. Thus, it is necessary to place the plastic bottles in a vertical attitude and arrange them in a substantially straight line. An unscrambling machine for light weight plastic bottles which has received a high degree of acceptance to perform this function is disclosed in U.S. Pat. No. 3,650,368, entitled, "Article Orienting Apparatus", issued Mar. 21, 1972, and invented by the inventor of the instant improvement, John C. Nalbach. John C. Nalbach is also the inventor of U.S. Pat. No. 3,662,872 entitled, "Apparatus For Orienting And Feeding Articles", issued May 16, 1972; and U.S. Pat. No. 3,948,386 entitled, "Apparatus For Orienting And Feeding Articles". The machines disclosed in the last two mentioned patents have not received the wide acceptance as the machine disclosed in the first mentioned patent.

The speed of filling machines has increased with the passage of time. The first mentioned patented unscrambling machine is capable of operating at a maximum rate of rotation. Otherwise, the plastic bottles tend to tip and fall over at high rates of rotation. It is therefore necessary to provide an improved construction for an unscrambler which has a sufficiently high rate of delivery of plastic bottles which are properly oriented and aligned to allow a filling machine to operate at its optimum capacity.

SUMMARY OF THE INVENTION

The present invention provides an improved apparatus for orienting light weight articles, such as, empty light weight plastic bottles. The apparatus generally includes a hopper or bowl for receiving and holding randomly positioned light weight plastic bottles. The hopper includes a conical interior wall having a substantially vertical center axis and having its larger end extending upward. An upwardly inclined track is mounted on the interior of the conical wall. A plurality of low pressure ports is formed in the conical wall adjacent to the upwardly inclined track. Exhaust means is connected to the low pressure ports for exhausting air through the low pressure ports to cause an air flow toward the low pressure ports and thereby hold light weight plastic bottles on the track. A plurality of pusher bars is mounted in the hopper adjacent to the interior of the conical wall. Each pusher bar is adapted for engagement with a light weight plastic bottle positioned on the inclined track for moving the light weight container upward along the track. An annular upper shelf is connected to the upper end of the conical interior wall. The inclined track terminates at the upper shelf. The air flow holds the plastic bottles on the track while each pusher bar moves the respective plastic bottle upward along the track to deliver the light weight plastic bottle onto the upper shelf. The upper shelf has an opening spaced from the terminus of the inclined track to allow a light weight plastic bottle which has been pushed up the track onto the upper shelf to pass through the opening from the upper side of the upper shelf to a chute. A chute is positioned below the upper shelf for receiving a light weight plastic bottle from the shelf and orienting the plastic bottle to an attitude wherein the light weight plastic bottle is substantially vertical. A chute shelf is positioned below the upper shelf for temporarily holding a light weight plastic bottle in the chute. A lower shelf is positioned below the chute shelf. Light weight plastic bottles held in the chute move along the chute shelf to the end of the chute shelf from which they drop between lower pusher bars onto the lower shelf. Lower pusher bars engage the plastic bottles on the lower shelf to move the plastic bottles along the lower shelf to the end of the lower shelf. A longitudinal conveyor is positioned below the lower shelf at the end thereof for receiving the light weight plastic bottles from the lower shelf. The rate of movement of the plastic bottles on the lower shelf is substantially equal to the rate of movement of the conveyor to facilitate transfer of the containers from the lower shelf onto the conveyor.

It is an object of this invention to provide an improved light weight plastic container orienting apparatus which may conveniently orient empty plastic bottles at a high rate of speed.

It is another object of the instant invention to provide an improved light weight container orienting apparatus which operates automatically.

Other objects and uses of the herein disclosed invention will become readily apparent to those skilled in the art upon a perusal of the following specification in light of the accompanying drawings.

BRIEF DESCRIPTION OF THE DRAWINGS

FIG. 1 is a perspective view of an improved unscrambling machine which is a specific embodiment of the instant invention;

FIG. 2 is a top view of the unscrambling machine of FIG. 1 but with plastic bottles not shown;

FIG. 3 is a cross sectional view taken on Line 3—3 of FIG. 2;

FIG. 4 is an enlarged fragmentary perspective view of a portion of the unscrambling machine of FIG. 1 showing plastic bottles moved upward on an upwardly inclined track and showing an orientor assembly;

FIG. 5 is a perspective view similar to FIG. 4 showing light weight plastic bottles in orienting assemblies and a plastic bottle dislodging assembly for removing a stacked plastic bottle from the upwardly inclined track;

FIG. 6 is a perspective view showing a plastic bottle dropping from a chute to a lower shelf; and FIG. 7 is a perspective view of a longitudinal conveyor showing plastic bottles transferring from a lower shelf to a longitudinal conveyor.

DESCRIPTION OF THE PREFERRED EMBODIMENT

Referring now to the drawings, and especially to FIG. 1, an unscrambler, which is a specific embodiment of the instant invention, is shown therein and generally indicated by numeral 10. The instant unscrambler is adapted to orient and align light weight articles, and in particular, light weight plastic bottles. The instant unscrambler generally includes a stationary hopper or bowl 12 for receiving randomly positioned plastic bottles. An upper pusher assembly 14 is rotatably mounted in the bowl. A lower pusher assembly 16 rotates about the outside of the bowl. A stationary shelf assembly 18 is mounted outside the bowl for supporting plastic bottles in portions of the two pusher assemblies. A central support assembly 20 is connected to the shelf assembly and rotatably supports upper pusher assembly 14. A drive assembly 22 is drivingly connected to upper pusher assembly 14 and lower pusher assembly 16. A conventional longitudinal conveyor 24 is drivingly connected to drive assembly 22.

Stationary hopper or bowl 12 is symmetrical about a vertical center axis. The bowl includes a conical side wall 26 which has a center axis in the center of the bowl and is coincident with the center of the bowl. The larger end of the conical side wall defines the upper portion of the bowl. As may be seen in FIG. 2, four substantially identical upwardly inclined long tracks 28, 30, 32, and 34 are fixed to the interior of conical side wall 26. Each of the upwardly inclined long tracks extends from a lower portion of the conical side wall to the uppermost edge of the conical side wall. Four substantially identical upwardly inclined short tracks 36, 38, 40 and 42 are each alternately positioned between the upwardly inclined long tracks 28, 30, 32 and 34. Each of the upwardly inclined short tracks has its lowermost portion on the same level as the lowermost portion of the upwardly inclined tracks. Upwardly inclined short tracks 36, 38, 40 and 42 have substantially identical level portions 44, 46, 48 and 50, respectively, which level portions are each positioned approximately midway between the lowermost edge of the respective long track and the uppermost portion of the bowl. Each of the upwardly inclined short tracks has its upper end terminating adjacent to its respective long track. The upwardly inclined short tracks provide a means for additional loading of the upwardly inclined long tracks as is described in detail hereinafter. The conical side wall has a plurality of identical elongated slot like rectangular low pressure ports 52 along each of the upwardly inclined long tracks and along each of the upwardly inclined short tracks for holding plastic bottles on the tracks.

Deflectors 54, 56, 58 and 60 are each mounted on the interior of the conical side wall 26 adjacent to the upper portion of upwardly inclined long tracks 28, 30, 32 and 34, respectively. The deflectors are each positioned above the respective track a sufficient distance to allow a single plastic bottle to pass under each deflector, but the deflector will engage and push out a second plastic bottle riding on top of a first plastic bottle on the track. High pressure nozzles 62, 64, 66 and 68 are positioned adjacent to deflectors 54, 56, 58 and 60, respectively. These nozzles are connected to conventional source of compressed air through conventional pipes 70 which provide a means for delivering a stream of air under high pressure to push out a plastic bottle which is moved out by the respective deflector and thereby cause that plastic bottle to return to the lower portion of the bowl.

The bowl includes a substantially horizontal annular flat floor 72 which has its innermost edge sealingly fixed to the lowermost portion of conical side wall 26. A cylindrical bowl lower wall 74 has its lower edge sealingly fixed to the outermost edge of annular floor 72. An annular ledge 76 has its innermost edge sealingly fixed to the upper edge of the cylindrical bowl lower wall 74 to provide an offset in the bowl. A cylindrical bowl upper wall 78 has its lower edge sealingly fixed to the outer edge of annular ledge 76 and its upper edge sealingly fixed to the upper portion of conical side wall 26. It may be seen that the conical side wall, annular floor 72, cylindrical bowl lower wall 74, annular ledge 76, and cylindrical bowl upper wall form an annular low pressure chamber 79 which communicates with the interior of the bowl through low pressure ports 52. Chamber 79 is connected to a conventional exhaust pump 80 through a conventional pipe 81 for exhausting air from the chamber to cause a flow of air into ports 52.

As may be best seen in FIG. 2 of the drawings, four substantially horizontal upper shelves 82, 84, 86, and 88 are equiangularly spaced about the upper edge of the conical side wall and are fixed thereto. Each of the upper shelves is arcuate and conforms to the respective portion of outer edge of the conical side wall. Upper shelves 82, 84, 86 and 88 are positioned adjacent to the respective terminuses of upwardly inclined long tracks 28, 30, 32 and 34, respectively.

Four identical drop openings 90, 92, 94 and 96 are alternately positioned between pairs of upper shelves. Drop opening 90 is formed between upper shelves 82 and 84. Drop opening 92 is formed between upper shelves 84 and 86. Drop opening 94 is formed between upper shelves 86 and 88. Drop opening 96 is formed between upper shelves 82 and 88.

Hopper or stationary bowl 12 is mounted on central support assembly 20. The central support assembly includes a cylindrical support wall 98 which has its upper end fixed to the bottom of annular floor 72. The lower end of cylindrical support wall 98 is fixed to a connecting ring 100. The connecting ring is in turn secured to a plurality of support pads 102 by a plurality of conventional machine screws 104. The support pads are fixed to a pair of support bars 106 and 108 by the screws 104. The support bars 106 and 108 are mounted on top of drive assembly 22 as may be seen in FIG. 3. The central support assembly includes a pusher support ring 110 which is fixed to the outer surface of cylindrical support wall 98. The support ring has a plurality of studs 112 fixed therein. Each of the studs 112 has a support roller bearing 114 mounted thereon. Each roller bearing, as is conventional, includes an outer race. Each outer race of each bearing is grooved for receiving a portion of lower pusher assembly 16 for rotatably supporting the lower pusher assembly.

Lower pusher assembly 16 includes a roller chain ring 116 which has a V-shaped edge 118 on its interior edge. The V-shaped edge is mounted in engagement with the grooves in the outer races of roller bearings 114 and is rotatably supported thereby so that the lower pusher assembly rotates on an axis of rotation which is coincident with the center axis of the bowl. A conventional roller chain 120 is fixed to the exterior edge of the roller chain ring for engagement with a portion of the drive assembly which rotates the lower pusher assembly. A cylindrical lower wall support 122 is fixed to the roller chain ring 116. A cylindrical lower pusher side wall 124 has its lower edge fixed to lower wall support 122. A plurality of identical elongated lower pusher bars 126 is fixed to the outer surface of the cylindrical lower pusher side wall. Each pusher bar extends to the upper edge of the cylindrical lower pusher side wall. Each of the lower pusher bars has an upper beveled edge 128, as may be seen in FIGS. 6 and 7. The lower pusher bars are equidistantly spaced about the cylindrical lower pusher side wall. Each lower pusher bar is mounted substantially upright and is parallel to each other lower pusher bar. Each pair of adjacent lower pusher bars form a bottle receiving stall 129. There are forty-four stalls in the instant structure, however, it is to be understood that any other convenient number may be used in another construction.

Upper pusher assembly 14 includes a center shaft 130 which is connected to drive assembly 22 and is rotated thereby. The center shaft is in line with the center axis of the bowl so that the upper pusher assembly has its axis of rotation coincident with the center axis of the bowl. A center shaft support 132 supports the shaft vertically as it is rotated by the drive assembly. A generally circular pusher bar support 134 is connected to the center shaft support 132 for rotation with the center shaft. A center cone 136 having a flat substantially horizontal central portion 137 and a conical side portion 138 is fixed to the pusher bar support. A support ring 139 is mounted on the pusher bar support and supports the flat central portion 137 of the center cone. A concial diffuser 140 is mounted on a post 141. Post 141 is positioned inside of center shaft 130 and the post has its lowermost portion fixed so that the conical diffuser does not rotate. A pair of bearings 142 is mounted on post 141 within center shaft 130.

As may be seen in FIG 2, twelve identical upper pusher bars 144 are fixed to the pusher bar support. Each pusher bar is aligned substantially parallel to the conical side wall. The pusher bars are equiangularly positioned about the pusher bar support. The pusher bars rotate about an axis of rotation which is in line with the axis of rotation of the lower pusher assembly and with the center axis of the bowl. Although twelve pusher bars are used in the present unscrambler, it is readily apparent that another number of pusher bars may be utilized with another construction embodying the instant invention. Each of the upper pusher bars has a block 146 fixed to its uppermost edge which is positionable above each of the upper shelves and is adapted to push a plastic bottle along an upper shelf. As may be seen in FIGS. 4 and 5, each of the blocks has a bottle neck opening 148 formed therein to receive the neck of a plastic bottle. A retainer shelf 149 is mounted on the interior surface of the cylindrical chute wall and is spaced from each block 146 to form a conventional and well known bottle orientor or aligning assembly for aligning plastic bottles. A cylindrical chute wall 150 is secured to blocks 146. Twelve identical tapering chutes 152 are mounted on the interior surface of cylindrical chute wall 150 so that the chutes rotate with the upper pusher bars. As may be seen in FIGS. 6 and 7, each of the chutes 152 has a pair of inclined chute sides 154 which are fixed to the interior surface of the cylindrical chute wall. Each chute is formed by chute sides 154, chute wall 150, and wall 78. The upper portion of each of chutes 152 is the larger end for receiving a container and the lower end of each chute is smaller for guiding a plastic bottle downward into a stall 129 formed by a pair of lower pusher bars 126.

Drive assembly 22 includes a drive housing 160 upon which support assembly 20 rests. The drive housing includes a drive base 162 and a drive side wall 164 fixed to the drive base. A drive cover 166 is fixed to drive side wall 164 and supports the support bars 106 and 108. A shaft support 168 is mounted on the drive cover and rotatably supports center shaft 130. A conventional electrical motor 170 is mounted in the housing and is drivingly connected to a conventional speed reducer 172 through a drive pulley 174 which has a belt 176 mounted thereon. Belt 176 is drivingly connected to a driven pulley 178 which is in turn connected to the speed reducer. The speed reducer has an output shaft 180 drivingly connected to a main clutch 182. The main clutch is connected to a pinion which is in turn drivingly connected to gear 184. The gear 184 is secured to center shaft 130 to drive that shaft and thereby rotate the upper pusher assembly. It is to be noted that output shaft 180 is offset from the center line of center shaft 130 so that the output from the speed reducer is connected to gear 184 through a pinion. Gear 184 is drivingly connected to an intermediate shaft gear 186 which is mounted on an intermediate shaft 188. A sprocket 190 is fixed to intermediate shaft 188 and a timing belt 192 drivingly engages sprocket 190. An outer drive shaft 194 is mounted on a plurality of bearings 196. A driven sprocket 198 is mounted on the outer drive shaft and driven sprocket 198 is connected to timing belt 192. A secondary drive shaft 200 is mounted on a pair of bearings 202 and is connected to outer drive shaft 194 through a secondary clutch 204. A chain drive sprocket 206 is mounted on shaft 200. The chain drive sprocket engages roller chain 120 to drive the lower pusher assembly. Shaft 200 is also connected to longitudinal conveyor 24 in a conventional fashion to drive the conveyor at a selected rate so that plastic bottles leaving the stalls are traveling at the same rate as the longitudinal conveyor.

Stationary shelf assembly 18 includes arcuate shelf supports 208, 210 and 212. The arcuate shelf supports are fixed to the support bars 106 and 108 of the central support assembly 20. A plurality of shelf posts 214 is mounted on the arcuate shelf supports. Arcuate middle or chute shelves 216, 218, 220 and 222 are equiangularly positioned about the stationary bowl as may be seen in FIG. 2. The chute shelves are mounted on posts 214 below chutes 152 and above lower pusher bars 126. The arcuate chute shelves are positioned below the openings of the upper shelves so that chute shelf 216 is below drop opening 90. Chute shelf 218 is below drop opening 96. Chute shelf 220 is below drop opening 94, and chute shelf 222 is below drop opening 92. When a plastic bottle is pushed off its upper shelf and drops downward into the chute in the respective drop opening, the plastic bottle is retained in the chute by the arcuate chute shelf for as long as the chute is above its respective chute shelf.

A lower shelf 224 is mounted on a plurality of shelf ledges 226. Each shelf ledge is fixed to each of posts 214. The lower shelf 224 is substantially an annular shelf with an opening at the longitudinal conveyor 24. A plastic bottle, which is held in one of the chutes 152, moves along the respective chute shelf until that chute passes the edge of the chute shelf, then the plastic bottle drops down to a stall formed by adjacent lower pusher bars 126, as shown in FIG. 6. The lower pusher bar pushes the plastic bottle along the lower shelf to the end of the lower shelf over the longitudinal conveyor so that the plastic bottle is transferred to the longitudinal conveyor.

A generally cylindrical outer wall 228 is mounted between the chute shelves and the lower shelf. The wall terminates at the point where the containers are transferred to the longitudinal conveyor. Wall 228 has a plurality of openings 230 to allow an operator to inspect the operation of the unscrambler.

In the operation of the instant unscrambler, a plurality of identical containers which are, in this instance, blow molded plastic bottles 232, are loaded into bowl 12 from a chute 234 so that the bottles are randomly arranged. It may be appreciated that any means of introduction of the plastic bottles into the bowl may be utilized. The drive assembly 22 constantly rotates the upper pusher assembly 14. The bottles roll or slide down the stationary conical diffuser to the bottom of the pusher assembly. The upper pusher bars 144 are constantly rotating with the center cone. As each plastic bottle is engaged by one of the pusher bars, the bottle is moved along side wall 26 until the bottle engages an upwardly inclined long track or a upwardly inclined short track. Taking the situation in which a plastic bottle engages an upwardly inclined track, one of the pusher bars will push the plastic bottle along one of the tracks, such as, short track 36. Short track 36 has a plurality of low pressure ports 52 adjacent to that track. The annular low pressure chamber is connected to an exhaust means, namely, exhaust pump 80 by pipe 81. The exhaust pump is constantly pulling air in through the low pressure ports and thereby causing the plastic bottle to be held onto the track. In the case of a bottle which is on short track 36, eventually it goes to the level portion 44. Then, it leaves the end of level portion 44 and drops onto upwardly inclined long track 28, if there is no bottle on that track. If there is a bottle on long track 28, the bottle from short track 36 lands on top of a bottle which is already on inclined long track 28. The pusher continues to push both bottles up inclined long track 28 until the bottle which is on top engages deflector 54. This causes the forward portion of the bottle to be pushed outward. As the bottle is continued to be pushed upward, compressed air is emitted through high pressure nozzle 62 to push the bottle off the top of the bottle in engagement with inclined long track 28 and that bottle is returned to the bottom of the pusher assembly to go onto another track. It may be appreciated that the bottle on the short track makes certain that there is always a bottle to reach the end of each upwardly inclined long track. The single bottle on long track 28 then moves up the inclined long track and is delivered to upper shelf 82. When the bottle reaches upper shelf 82, the bottle orientor goes into effect.

If the bottom of the bottle is leading the bottle, then the neck falls into opening 148 in block 146. On the other hand, if the neck of the bottle is leading the bottle, the bottom of the bottle engages block 146 and the neck rests on retainer shelf 149.

The bottle leaves its upper shelf and is aligned vertically and carried through the unscrambler to the longitudinal conveyor. As is well known, when the bottle reaches the end of its upper shelf, the bottle drops bottom down. If the neck rests on the retainer shelf 149, clearly the bottom goes down first. On the other hand, if the neck of the bottle is in opening 148 of block 146, the bottom of the bottle goes down first. The bottle falling bottom down first enters chute 152 and is guided by the inclined chute sides 154 to be retained in an upright attitude. As was mentioned above, there are twelve chutes in the instant unscrambler. The bottles ride in their chutes along the chute shelf. In the case of the specific bottle mentioned above, the bottle rides along upper shelf 82 until the shelf terminates at opening 96 where the bottle drops down into a chute. The chute shelf 218 holds the bottle in the chute until the bottle comes to the end of the chute shelf and then drops down into a stall formed between a pair of lower pusher bars 126. The lower pusher bars form forty-four stalls as was mentioned above. The chutes 152 rotate with the pusher bar support 134 and are rotated at the same speed as the center shaft 130. The lower pusher assembly is driven at a different rate of rotation. The rate of rotation of the lower pusher assembly is greater than that of the upper pusher assembly so that the stalls formed by the lower pusher bars advance one chute for each quarter revolution of the upper pusher assembly.

A plastic bottle riding on the lower shelf moves along the lower shelf until the plastic bottle reaches the end of the lower shelf where the plastic bottle drops onto the longitudinal conveyor. The longitudinal conveyor is conventional in its construction in that it includes a longitudinally moving floor 240 which is synchronized for movement of the lower pusher bars so that there is no change in rate of movement of the plastic bottles as they leave the lower shelf and land on the conveyor. The conveyor has a pair of guide rails 242 and 244 which is conventional to prevent the bottles from tipping.

Although the operation of one upwardly inclined short track and a single upwardly inclined long track has been described in detail above, it is readily apparent that the remaining inclined tracks operate in the same manner. The inclined short tracks are provided to make certain that there is a bottle on its respective inclined long track so that a bottle drops onto the respective upper shelf as the upper pusher assembly rotates. The instant arrangement of providing four openings for introduction of plastic bottles into the chutes for setting the plastic bottles upright allows the unscrambler to align a substantial number of bottles. Specifically, the above described unscrambler aligns forty-eight bottles with each complete rotation of the upper pusher assembly. Thus, the quantity of bottles oriented and aligned is quadrupled over the prior art machine operating at the same rate of rotation.

It is readily apparent that the instant unscrambler may be modified to accommodate a wide variety of light weight containers having different sizes and shapes. Although specific numbers have been set forth herein, it is readily apparent that those skilled in the art may make various modifications and changes in the disclosed apparatus without departing from the spirit and scope of the present invention. It is to be expressly understood that the instant invention is limited only by the appended claims.

What is claimed is:

1. An apparatus for orienting light weight articles comprising; a stationary hopper for receiving and holding randomly positioned light weight articles, said hopper including a fixed conical wall having its larger end extending upward, an upwardly inclined track mounted within the hopper on the conical wall, a pusher bar rotatably mounted in said hopper and adapted for engagement with a light weight article on the inclined track for moving the light weight article upward along the inclined track, drive means connected to the pusher bar for rotating the pusher bar a chute positionable adjacent to the track for receiving a light weight article from the track and aligning the light weight article to a position wherein the light weight article is in a substantially vertical attitude, a plurality of low pressure ports formed in the conical wall adjacent to the upwardly inclined track, and exhaust means connected to the low pressure ports for exhausting air through the low pressure ports for holding light weight articles on the track.

2. An apparatus for orienting light weight articles comprising; a stationary hopper for receiving and holding randomly positioned light weight articles, an upwardly inclined track mounted within the hopper, said hopper including a fixed conical wall having its larger end extending upward, said upwardly inclined track being a long track and being mounted on the conical wall, an upwardly inclined short track mounted on the conical wall and terminating adjacent to a portion of the upwardly inclined long track, a pusher bar rotatably mounted in said hopper and adapted for engagement with a light weight article on either of the inclined tracks for moving the light weight article upward along the respective inclined track, drive means connected to the pusher bar for rotating the pusher bar and a chute positionable adjacent to the long track for receiving a light weight article from the long track and aligning the light weight article to a position wherein the light weight article is in a substantially vertical attitude.

3. An apparatus for orienting light weight articles comprising; a stationary hopper for receiving and holding randomly positioned light weight articles, said hopper including a fixed conical wall having its larger end extending upward, an upwardly inclined track mounted within the hopper on the conical wall, a plurality of pusher bars each rotatably mounted within the conical wall and adapted for engagement with a light weight article on the inclined track for moving the light weight article upward along the inclined track, drive means connected to the pusher bars for rotating the pusher bars, and a chute positionable adjacent to the track for receiving a light weight article from the track and aligning the light weight article to a position wherein the light weight article is in a substantially vertical attitude.

4. An apparatus for orienting light weight articles comprising; a stationary hopper for receiving and holding randomly positioned light weight articles, said hopper including a fixed conical wall having its larger end extending upward, an upwardly inclined long track mounted within the hopper on the conical wall, an upwardly inclined short track mounted on the conical wall and having an upper end terminating adjacent to a portion of the upwardly inclined long track, a pusher bar rotatably mounted in said hopper and adapted for engagement with a light weight article on either of the inclined tracks for moving the light weight article upward along the respective inclined track, drive means connected to the pusher bar for rotating the pusher bar a chute positionable adjacent to the long track for receiving a light weight article from the long track and aligning the light weight article to a position wherein the light weight article is in a substantially vertical attitude, a plurality of low pressure ports formed in the conical wall adjacent to the upwardly inclined long track, a second plurality of low pressure ports formed in the conical wall adjacent to the short upwardly inclined track, and exhaust means connected to the pluralities of low pressure ports for exhausting air through said low pressure ports to hold light weight articles on their respective tracks.

5. An apparatus for orienting light weight articles comprising; a stationary hopper for receiving and holding randomly positioned light weight articles, said hopper including a fixed conical wall having its larger end extending upward, an upwardly inclined track mounted within the hopper on the conical wall, a pusher bar rotatably mounted in said hopper and adapted for engagement with a light weight article on the inclined track for moving the light weight article upward along the inclined track, a chute positionable adjacent to the track for receiving a light weight article from the track and aligning the light weight article to a position wherein the light weight article is in a substantially vertical attitude, a plurality of low pressure ports formed in the conical wall adjacent to the upwardly inclined track, exhaust means connected to the low pressure ports for exhausting air through the low pressure ports to hold light weight articles on the track, an upper shelf mounted on the upper portion of the hopper for receiving light weight articles from the upwardly inclined track, an aligning assembly connected to the pusher bar and movable therewith for aligning light weight articles about to enter the chute, a chute shelf fixed relative to the hopper and positioned below the chute for supporting light weight articles in the chute, a lower shelf fixed relative to the hopper and being spaced from the chute shelf, a second plurality of lower pusher bars movably positioned between the lower shelf and the chute shelf for receiving vertically positioned light weight articles from the chute and moving the light weight articles along the lower shelf, and drive means connected to the lower pusher bars for rotating the lower pusher bars, said drive means being connected to the first mentioned pusher bar for rotating the first mentioned pusher bar at a lower rate of rotation than the lower pusher bars.

6. An apparatus for orienting light weight articles comprising; a stationary hopper for receiving and holding randomly positioned light weight articles, said hopper including a fixed conical wall having its larger end extending upward, a plurality of upwardly inclined tracks mounted within the hopper on the interior of the conical wall, said upwardly inclined tracks being equiangularly spaced about the conical wall, a plurality of pusher bars rotatably mounted in the hopper and adapted for engagement with light weight articles on the inclined tracks for moving the light weight articles upward along the inclined tracks, an annular upper shelf mounted on the upper portion of the hopper adjacent to each upwardly inclined track for receiving light weight articles from its respective upwardly inclined track, said upper shelves being spaced apart by openings between adjacent shevles equal in number to the number of upwardly inclined tracks, a plurality of chutes rotatably mounted under the upper shelves adjacent to the tracks for receiving light weight articles from the tracks and aligning the light weight articles to a position wherein the light weight articles are in a substantially vertical attitude, means connected to the pusher bars and movable therewith for moving light weight articles along the upper shelves to said openings for delivery of light weight articles to the chutes, a plurality of lower pusher bars movably positioned below the chutes, and drive means connected to the first mentioned plurality of pusher bars and to said plurality of lower pusher bars for rotating each of the pluralities of pusher bars.

7. An apparatus for orienting light weight articles comprising; a stationary hopper for receiving and holding randomly positioned light weight articles, said hopper including a fixed conical wall having its smaller end extending downward, a plurality of upwardly inclined tracks mounted within the hopper on the interior surface of the conical wall, said upwardly inclined tracks being equiangularly spaced within the conical wall, annular upper shelves equal in number to said tracks mounted on the upper portion of the hopper for receiving light weight articles from the upwardly inclined tracks, said upper shelves having openings therebetween equal in number to the number of upwardly inclined tracks mounted on the interior of the conical wall, a plurality of chutes rotatably mounted on the hopper below the upper shelves positionable adjacent to the tracks for receiving light weight articles from the tracks and aligning the light weight articles to a position wherein the light weight articles are in a substantially vertical attitude, a plurality of pusher bars rotatably mounted in the hopper, means connected to the pusher bars and movable therewith for moving light weight articles along the upper shelves to one of said openings for delivering light weight articles to the chutes, a plurality of lower pusher bars movably positioned below the chutes, and drive means connected to the lower pusher bars for rotating the lower pusher bars, said drive means connected to the first mentioned pusher bars rotating the first mentioned pusher bars at a lower rate of rotation than the lower pusher bars.

8. An apparatus for orienting light weight articles comprising, a stationary hopper for receiving and holding randomly positioned light weight articles, said hopper including a fixed conical wall having its larger end extending upward, an upwardly inclined track mounted within the hopper on the interior of the conical wall, a conical deflector mounted within the fixed conical wall, a plurality of pusher bars rotatably mounted in the hopper and adapted for engagement with a light weight article on the inclined track for moving the light weight article upward along the inclined track, a plurality of low pressure ports formed in the conical wall adjacent to the upwardly inclined track, exhaust means connected to the low pressure ports for exhausting air throught the low pressure ports to hold light weight articles on the track, a chute positionable adjacent to the track for receiving a light weight article from the track and aligning the light weight article to a position wherein the light weight article is in a substantially vertical attitude, an upper shelf mounted on the upper portion of the hopper for receiving light weight articles from the upwardly inclined track, an aligning assembly connected to the pusher bars and movable therewith for aligning light weight articles about to enter the chute, a chute shelf fixed relative to the hopper and positioned below the chute for supporting light weight articles in the chute, a lower shelf fixed relative to the hopper and being spaced from the chute shelf, a plurality of lower pusher bars movably positioned between the lower shelf and the chute shelf for receiving vertically positioned light weight articles from the chute and moving the light weight articles along the lower shelf, and drive means connected to the first mentioned pusher bars, said drive means connected to the lower pusher bars and rotating the lower pusher bars at a faster rate of rotation than the first mentioned pusher bars.

9. An apparatus for orienting light weight articles comprising; a stationary hopper for receiving and holding randomly positioned light weight articles, said hopper including a fixed conical wall having its larger end extending upward, an upwardly inclined long track mounted within the hopper on the interior surface of the conical wall, an upwardly inclined short track mounted on the conical wall and having one end positioned adjacent to a portion of the upwardly inclined long track, a plurality of pusher bars rotatably mounted in the hopper and adapted for engagement with light weight articles on the inclined tracks for moving light weight articles upward along the inclined tracks, an upper shelf mounted on the upper portion of the hopper for receiving light weight articles from the upwardly inclined long track, a chute positionable adjacent to the long track for receiving a light weight article from the long track and aligning the light weight article to a position wherein the light weight article is in a substantially vertical attitude, an aligning assembly connected to the pusher bars and movable therewith for aligning light weight articles about to enter the chute, a chute shelf fixed relative to the hopper and positioned below the chute for supporting light weight articles in the chute, a lower shelf fixed to the hopper and being spaced from the chute shelf, a plurality of lower pusher bars movably positioned between the lower shelf and the chute shelf for receiving vertically aligned light weight articles from the chute for moving the light weight articles along the lower shelf, and drive means connected to the lower pusher bars for rotating the lower pusher bars, said drive means connected to the first mentioned pusher bars rotating the first mentioned pusher bars at a lower rate of rotation than that of the lower pusher bars.

10. An apparatus for orienting light weight articles comprising; a stationary hopper for receiving and holding randomly positioned light weight articles, said hopper including a fixed conical wall having its larger end extending upward, an upwardly inclined long track mounted within the hopper on the interior portion of the conical wall, a plurality of low pressure ports formed in the conical wall adjacent to the upwardly inclined long track, an upwardly inclined short track mounted on the interior of the conical wall and having its upper end terminating adjacent to a portion of the upwardly inclined long track, a second plurality of low pressure ports formed in the conical wall adjacent to the upwardly inclined short track, exhaust means connected to the first mentioned plurality and the second plurality of low pressure ports for exhausting air through said low pressure ports to hold light weight articles on the respective tracks, a plurality of pusher bars rotatably mounted in the hopper and adapted for engagement with light weight articles on the inclined tracks for moving light weight articles upward along the inclined tracks, a nozzle mounted on the interior of the conical wall adjacent to the upwardly inclined long track, means for delivering air under pressure to the nozzle for removing a light weight article positioned on top of another light weight article positioned on the upwardly inclined long track, a chute positionable adjacent to the long track for receiving a light weight article from the long track and aligning the light weight article to a position wherein the light weight article is in a substantially vertical attitude, an aligning assembly connected to the pusher bars and movable therewith for aligning light weight articles about to enter the chute, a chute shelf fixed relative to the hopper and positioned below the chute for supporting light weight articles in the chute, a lower shelf fixed relative to the hopper and being spaced from the chute shelf, a plurality of lower pusher bars movably positioned between the lower shelf and the chute shelf for receiving vertically aligned light weight articles from the chute and moving the light weight articles along the lower shelf, and drive means connected to the lower pusher bars and rotating the lower pusher bars, said drive means connected to the first mentioned pusher bars rotating the first mentioned pusher bars at a lower rate of rotation than that of the lower pusher bars.

11. An apparatus for orienting light weight articles comprising; a stationary hopper for receiving and holding randomly positioned light weight articles, said hopper having a substantially vertical center axis, said hopper including a fixed conical wall having a conical wall center axis coincident with the center axis of the hopper and having its smaller end extending downward, a plurality of pusher bars rotatably mounted in the hopper rotating about an axis of rotation being in substantial coincidence with the center axis of the hopper, a plurality of upwardly inclined long tracks mounted within the hopper on the interior surface of the conical wall, said upwardly inclined long tracks being equiangularly spaced within the conical wall about the center axis of the hopper, said pusher bars being adapted for engagement with light weight articles on the inclined long tracks for moving the light weight articles upward along the inclined long tracks, annular upper shelves equal in number to the upwardly inclined long tracks mounted on the upper portion of the hopper for receiving light weight articles from the upwardly inclined long tracks, said upper shelves having an opening between adjacent shelves equal in number to the number of upwardly inclined long tracks mounted on the interior of the conical wall, a plurality of chutes being rotatably mounted on the hopper below the upper shelf positionable adjacent to the long tracks for receiving light weight articles from the long tracks and aligning the light weight articles to a position wherein the light weight articles are in a substantially vertical attitude, said chutes rotating about substantially the same axis of rotation as the plurality of pusher bars, means connected to the pusher bars and movable therewith for moving light weight articles along the upper shelves to one of said openings between the upper shelves for delivering light weight articles to the chutes, a plurality of lower pusher bars movably positioned below the chutes for receiving light weight articles from the chutes, said lower pusher bars rotating about an axis of rotation being substantially the same axis of rotation as the plurality of pusher bars, a conveyor positioned below the lower pusher bars for receiving light weight articles and carrying away the light weight articles from the lower pusher bars, and drive means connected to the lower pusher bars for rotating the lower pusher bars, said drive means connected to the first mentioned pusher bars rotating the first mentioned pusher bars at a lower rate of rotation than that of the lower pusher bars, said drive means connected to the conveyor for moving the conveyor at a rate compatible with the rate of rotation of the lower pusher bars for transfer of light weight articles by the lower pusher bars to the conveyor.

12. An apparatus for orienting light weight articles comprising; a hopper for receiving and holding randomly positioned light weight articles, said hopper having a substantially vertical center axis, said hopper having a fixed conical wall having its larger end extending upward, said conical wall having a center axis coincident with the center axis of the hopper, an upwardly inclined long track mounted on the conical wall, a plurality of pusher bars rotatably mounted in said hopper movable adjacent to the upwardly inclined long track adapted for engagement with a light weight article on the inclined long track for moving the light weight article upward along the inclined long track, a conical diffuser mounted with the fixed conical wall, drive means connected to the pusher bars for rotating the pusher bars, a plurality of low pressure ports formed in the conical wall adjacent to the upwardly inclined long track, an upwardly inclined short track mounted on the conical wall and having its upper end terminating adjacent to a portion of the upwardly inclined long track, a second plurality of low pressure ports formed in the conical wall adjacent to the upwardly inclined short track, exhaust means connected to the pluralities of low pressure ports for exhausting air through said low pressure ports for holding light weight articles on respective tracks, said pusher bars movably positionable adjacent to the inclined short track for moving the light weight articles upward along the inclined short track, a deflector mounted on the conical wall adjacent to and spaced a sufficient distance to allow a light weight article on the long track to pass under the deflector, a nozzle mounted on the conical wall adjacent to the deflector, means for providing air under pressure to said nozzle for removing a light weight article positioned on top of another light weight article positioned on the upwardly inclined long track, an upper shelf mounted on the outer periphery of the upper portion conical wall for receiving light weight articles from the inclined long track, an aligning assembly connected to the pusher bars and movable therewith for moving light weight articles along the upper shelf, a chute connected to the pusher bars and movable therewith for receiving a light weight article from the aligning assembly to align the light weight article in a vertical attitude, a chute shelf fixed relative to the hopper and positioned below the chute for supporting the light weight article in the chute, a lower shelf fixed relative to the hopper and being spaced from the chute shelf, a plurality of lower pusher bars movably positioned above the lower shelf for receiving an article from the chute and moving the article along the lower shelf, said lower pusher bars being drivingly connected to the drive means and rotating at a faster rate than the first mentioned pusher bars, and a longitudinal conveyor positioned adjacent to an end of the lower shelf for receiving light weight articles from the lower shelf to carry away vertically positioned light weight articles.

13. An apparatus for orienting light weight articles, comprising; a hopper for receiving and holding randomly positioned light weight articles, said hopper having a substantially vertical center axis, said hopper having a fixed conical wall having its larger end extending upward, said conical wall having a center axis coincident with the center axis of the hopper, a plurality of upwardly inclined long tracks mounted in the interior of the conical wall, said tracks being equiangularly spaced from each other about the conical wall, a plurality of pusher bars rotatably mounted in said hopper movable adjacent to the upwardly inclined long tracks and adapted for engagement with light weight articles positioned on the inclined long tracks for moving the light weight articles upward along each of the inclined long tracks, a conical diffuser mounted within the lower portion of the conical wall, said pusher bars rotating about an axis of rotation substantially coincident with the center axis of the hopper, drive means connected to the pusher bars for rotating the pusher bars at a selected rate of rotation, a plurality of low pressure ports formed in the conical wall adjacent to each of the upwardly inclined long tracks, upwardly inclined short tracks equal in number to the first mentioned upwardly inclined long tracks mounted on the conical wall and equidistantly spaced between the first mentioned upwardly inclined long tracks, each of said upwardly inclined short tracks having its upper end terminating adjacent to a portion of one of the upwardly inclined long tracks, a second plurality of low pressure ports formed in the conical wall adjacent to each of the short upwardly inclined tracks, exhaust means connected to the pluralities of low pressure ports for exhausting air through the low pressure ports for holding light weight articles on the respective tracks, said pusher bars movably positioned adjacent to the inclined short tracks for moving the light weight articles upwardly along each of the inclined short tracks, a nozzle mounted on the conical wall adjacent to each of the inclined long tracks, means providing air under pressure to the nozzle for removing a light weight article positioned on top of another light weight article positioned on the respective upwardly inclined long track, annular upper shelves equal in number to the number of upwardly inclined long tracks mounted on the outer periphery of the upper portion of the conical wall for receiving light weight articles from a respective inclined long track, said upper shelves having openings equal in number to the number of upwardly inclined long tracks, an aligning assembly connected to each of the pusher bars and movable therewith for moving the light weight articles along an upper shelf to one of said openings, a plurality of chutes connected to the pusher bars and movable therewith for receiving a light weight article through one of said openings which article is delivered by the aligning assembly to align the light weight article in a vertical attitude in the chute, chute shelves equal in number to the upper shelves fixed relative to the hopper and positioned below the chutes for supporting the light weight article in the chute, said chute shelves having chute openings between adjacent chute shelves equal in number to the number of upwardly inclined long tracks mounted on the conical wall to allow the light weight articles in the chute to drop downward, a lower shelf fixed relative to the hopper and being spaced below the chute shelf for receiving light weight articles from the chute and chute shelf, and a plurality of lower pusher bars movably positioned above the lower shelf for receiving a light weight article from the chute and moving the article along the lower shelf, said lower pusher bars being drivingly connected to the drive means and rotating at a faster rate than the first mentioned pusher bars, and a longitudinal conveyor positioned adjacent to an end of the lower shelf for receiving light weight articles from the lower shelf to carry away the light weight articles, said longitudinal conveyor drivingly connected to the drive means to move at a speed compatible with the rate of rotation of the lower pusher bars to transfer light weight articles from the lower shelf to the longitudinal conveyor.

* * * * *